United States Patent [19]

Matsubara et al.

[11] Patent Number: 5,166,510
[45] Date of Patent: Nov. 24, 1992

[54] LIGHT PRINTER WITH PHOTOELECTRIC LIGHT QUANTITY CONTROL MEANS

[75] Inventors: Ken Matsubara; Tsukasa Yagi; Tomohiko Masuda; Koji Wakamiya, all of Osaka; Itaru Saito, Itami; Kenichi Wada, Takatsuki; Hirohisa Kitano, Osaka, all of Japan

[73] Assignee: Minolta Camera Co., Ltd., Osaka, Japan

[21] Appl. No.: 680,817

[22] Filed: Apr. 4, 1991

[30] Foreign Application Priority Data

Apr. 4, 1990 [JP] Japan .................. 2-091020
Apr. 4, 1990 [JP] Japan .................. 2-091021

[51] Int. Cl.⁵ ................................. G01V 1/32
[52] U.S. Cl. .......................... 250/205; 358/75; 359/249
[58] Field of Search ............... 250/201.1, 205, 229, 250/237 R; 358/482, 75; 359/245, 246, 249; 346/108, 160

[56] References Cited

U.S. PATENT DOCUMENTS

| 4,071,751 | 1/1978 | Waksberg | 359/249 |
| 4,095,099 | 6/1978 | Ehrenhaft | 250/205 |
| 4,629,879 | 12/1986 | Baldwin et al. | 250/205 |

Primary Examiner—David C. Nelms
Attorney, Agent, or Firm—Price, Gess & Ubell

[57] ABSTRACT

A light printer with a light shutter having an array of electro-optical elements is disclosed. The light printer provides with a detection circuit for monitoring temperature and/or time dependent variations regarding the electro-optical elements of the light shutter and a driving voltage control circuit for controlling an optimum driving voltage of the light shutter according to results detected by the detection circuit.

24 Claims, 11 Drawing Sheets

LIGHT PRINTER WITH PHOTOELECTRIC LIGHT QUANTITY CONTROL MEANS

BACKGROUND OF THE INVENTION

1. Field of the Invention

The present invention relates to a light printer using electro-optical devices such as PLZT devices as light modulation means and more particularly to a light printer including a light shutter arranged between a light source and a photoconductor which is comprised of recording electro-optical elements aligned in a row and a recording control means for applying driving voltages to respective electro-optical elements according to recording data.

2. Description of the Prior Art

The light shutter providing electro-optical elements such as PLZT devices controls quantities of lights transmitting through respective electro-optical elements by applying driving voltages to them according to data to be recorded. It is known with respect to the electro-optical device that it has a temperature dependance and a driving voltage which gives a maximum transmittance, namely a half wavelength voltage varies dependently on a temperature thereof. Accordingly, if an identical driving voltage is applied to record to an identical recording data at different temperatures, the density of record varies with the temperature at that time.

In order to solve this problem, there has been proposed a light printer capable of controlling quantities of transmission light so that an identical density of record may be obtained to an identical recording data which provides with a monitoring electro-optical shutter for measuring the intensity of a transmission light transmitted therethrough and controls individual driving voltage according to results obtained thereby (See, for example, Japanese Utility Model laid-open publication No. S 63-189834).

However, even in the light printer mentioned above an identical density is not necessarily obtained to an identical recording data when used for a long time. This seems to be caused by variation of the half wavelength voltage due to internal polarization of the electro-optical material, namely optical fatigue caused by repetition of application of the driving voltage in use for a long time. Further, the degree of fatigue is different among electro-optical devices since the total amount of exposure differs among them and, accordingly, the amount of variation in the half wavelength voltage differs according to the degree of fatigue.

Since only one monitoring electro-optical element is provided in the light printer mentioned above, it is impossible to know the degree of fatigue with respect to individual shutter elements and, accordingly, is impossible to control the driving voltages according to degrees of fatigue of individual electro-optical elements. Further, if there exist some electro-optical elements having optical fatigue different from that of the monitoring electro-optical shutter, the resultant record becomes irregular when the light shutter is controlled according to data obtained from the monitoring shutter.

SUMMARY OF THE INVENTION

An essential object of the present invention is to provide a light printer capable of obtaining regular records irrespective of variation in the driving conditions depending on the temperature thereof and optical fatigues of individual electro-optical elements.

Another essential object of the present invention is to provide a light printer capable of obtaining much more information regarding driving conditions of a light shutter.

One more essential object of the present invention is to provide a light printer capable of compensating for time-dependent variations of a light shutter.

A further object of the present invention is to provide a light printer utilizing at least two of the electro-optical elements forming a light shutter for monitoring quantities of lights transmitting therethrough.

One more further object of the present invention is to provide a light printer which includes a monitoring light shutter comprised of at least two electro-optical elements.

To accomplish these objects, according to the present invention, there is provided a light shutter arranged between a light source and a photoconductor which has a plurality of electro-optical elements aligned in a row, at least two of said plurality of electro-optical elements being designated as monitoring elements, record control means for applying driving voltages to respective electro-optical elements according to recording data, monitoring drive means for applying driving voltages of different values to respective monitoring elements, at least one photosensor for detecting quantities of light transmitting through said respective monitoring elements, and light quantity control means for controlling quantities of lights transmitting through said respective electro-optical elements of said light shutter by controlling said record control means according to results obtained by said at least one photosensor.

According to one aspect of the present invention, there is provided a light shutter arranged between a light source and a photoconductor which has a plurality of electro-optical elements aligned in a row, record control means for applying driving voltages to respective electro-optical elements according to recording data, a monitoring light shutter being comprised of at least two electro-optical elements, means for applying driving voltages of different values to at least two electro-optical elements, respectively; a monitoring illumination means for illuminating said at least two electro-optical elements, monitoring photosensor means for detecting quantities of lights having been transmitted through said at least two electro-optical elements; and a light quantity control means for controlling quantities of lights transmitting through said respective electro-optical elements of said light shutter by controlling said record control means according to results obtained by said monitoring photosensor means.

According to another aspect of the present invention, there is provided a light shutter arranged between a light source and a photoconductor which has a plurality of electro-optical elements aligned in a row, record control means for applying driving voltages to said light shutter, measurement means for measuring dielectric constants of at least one shutter element of said light shutter means; and light quantity control means for controlling quantities of lights having transmitted according to said dielectric constants measured.

BRIEF DESCRIPTION OF THE DRAWINGS

These and other objects and features of the present invention will become clear from the following description taken in conjunction with the preferred embodiments thereof with reference to the accompanying drawings throughout which like parts are designated by like reference numerals, and in which.

DETAILED DESCRIPTION OF THE PREFERRED EMBODIMENTS

Figure 3:
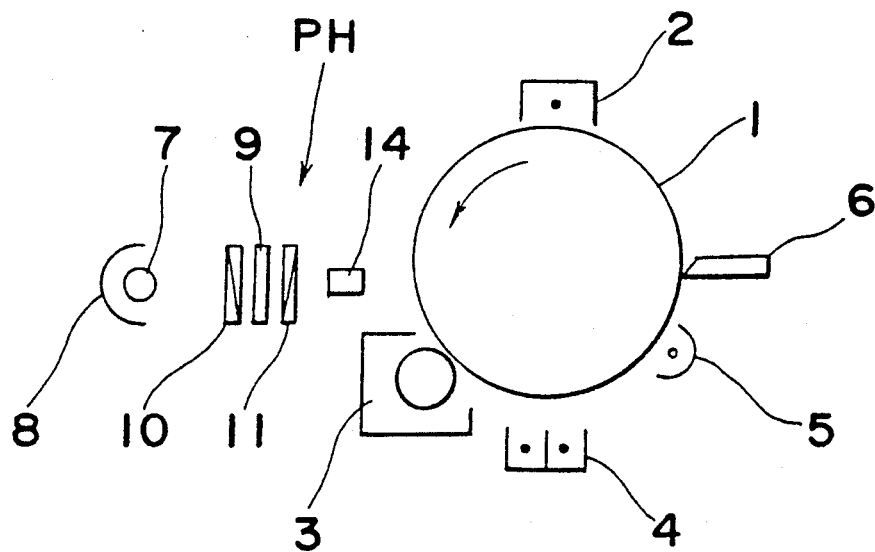
FIG. 3 is a schematical view showing an important portion of a light printer to which the present invention is applied.

FIG. 3 shows a schematical composition of a light printer for printing print information on a record sheet according to the electro-photographic method.

The light printer is provided with a drum-like photoconductor 1. Around the photoconductor 1 which is driven to rotate about the axis thereof in one direction as indicated by an arrow, there are arranged a charger 2 for electrifying the surface of the photoconductor 1 uniformly, a light print head PH for forming an electrostatic latent image corresponding to record information on the photoconductor 1, a developing apparatus 3 for forming a toner image by developing the electrostatic latent image with toner, a transfer and separation charger 4 for transferring the toner image on a record paper (not shown) and separating the record paper from the photoconductor 1, a main eraser 5 for erasing residual charges on the photoconductor 1 and a cleaner 6 for scratching off toner remaining on the photoconductor.

Figure 2:
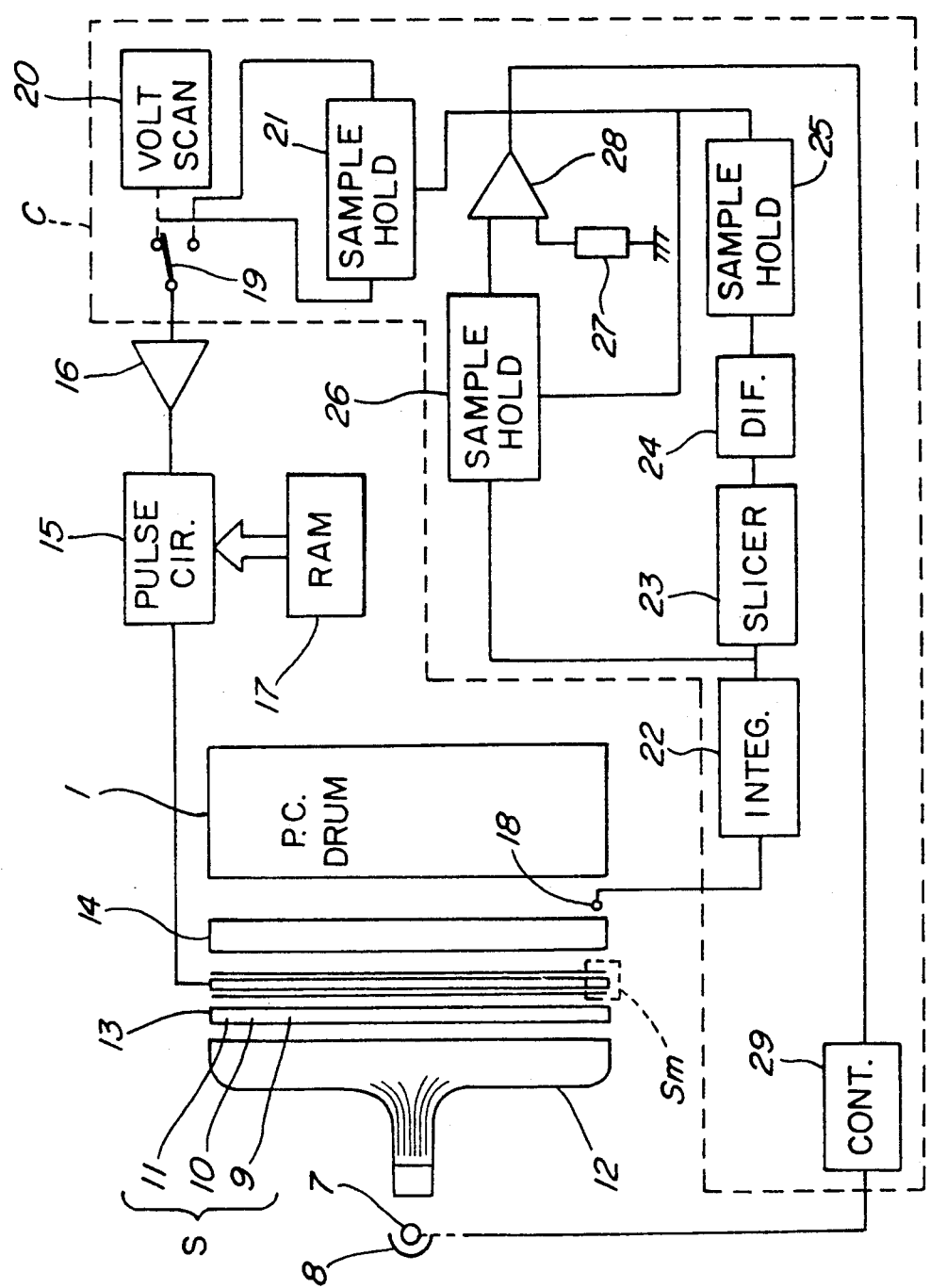
FIG. 2 is a block diagram of a light shutter control circuit according to the first preferred embodiment.

As shown in FIG. 2, the light print head PH includes a light source 7, a reflection mirror 8 for the light source 7, a PLZT array 9 comprised of plural electro-optical elements aligned in a direction parallel to the axis of the photoconductor 1, a pair of polarizers 10 and 11 arranged in a form of crossed Nicol so as to sandwich the PLZT array 9, a bundle 12 of optical fibers for guiding a light from the light source 7 to individual elements of the PLZT array 9, a rod lens 13 for introducing light beams emitted from the bundle 12 of optical fibers to a light shutter S for transmitting print beams which is comprised of said pair of polarizers 10 and 11 and said PLZT array and a lens array 14 of distributed refraction index type for focusing transmission light beams having passed through the light shutter S on the surface of the photoconductor.

The PLZT array 9 is comprised of plural transparent PLZT chips aligned in a row. Each PLZT chip has plural micro portions aligned in a direction of the alignment of said chips so as to correspond to dots one to one and individual electrodes provided for applying driving voltages to said plural micro portions, respectively. Further, a common electrode is provided for micro portions of all PLZT chips.

In the light print head PH including said PLZT array 9, a light emitted from the light source 8 is guided distributedly by the optical fiber bundle 12 to the PLZT array 9 through the rod lens 13 and the polarizer 10 arranged at the side of the light source 8. The polarizer 10 allows to pass only a light component polarized in one direction. The PLZT forming the PLZT array 9 has a birefrigence and, when a predetermined voltage is applied thereto, makes an incident light transmit therethrough after rotating the plane of polarized wave thereof by an angle responsive to said predetermined voltage applied. Since the other polarizer 11 of the light shutter S at the side of the photoconductor 1 is arranged so as to have a relation of crossed Nicol to another polarizer 10, a light beam having transmitted through a micro portion to which no voltage is applied is shut off by the polarizer 11 at the side of the photoconductor 1 and a light beam having transmitted through a micro portion to which a predetermined voltage is applied passes through a polarizer 11 at a rate proportional to the predetermined voltage applied and, then, is focused on the photoconductor 1 by the lens array 14 of distributed refraction index type to form a latent image by erasing a charge on the area at which the transmitted light is focused. The latent image is visualized as a toner image by developing it with toner.

In order to apply driving voltages to individual micro portions selectively, there is provided a driving pulse generating circuit 15. To this circuit 15, a driving voltage is applied by a voltage generating circuit 16 and record information is inputted from a print memory 17. Said driving pulse generating circuit 15 applies driving voltages supplied thereto to respective micro portions at a pulse rate determined according to the record information inputted. Thus, the light shutter S driven to form a latent image on the photoconductor 1 according to the record information and then, a toner image visualized with toner is transferred and fixed on a print sheet.

Figure 1:
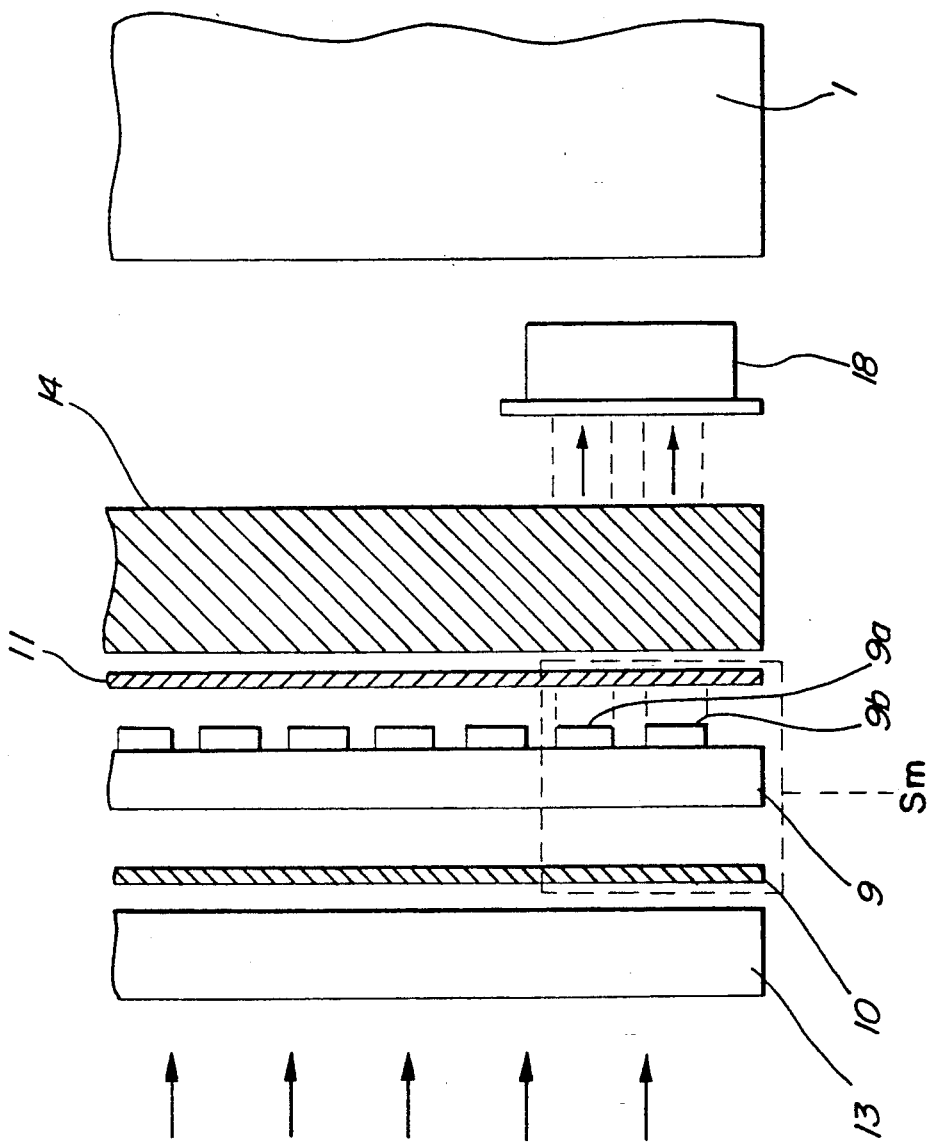
FIG. 1 is a partial view of a light shutter according to a first preferred embodiment of the present invention.

As shown in FIG. 1, the light shutter S is provided with a monitoring light shutter Sm which is formed by extending the same in a length-wise direction thereof to an area irrelevant to image formation. Said monitoring light shutter Sm includes at least two micro portions 9a and 9b which are arranged on the PLZT array 9 and formed by PLZT and lights having transmitted therethrough are detected by a light receiving device 18 arranged between said monitoring light shutter Sm and the photoconductor 1 so as to oppose to the two micro portions 9a and 9b. An output from said light receiving device 18, which is monitoring information reflecting a light amount having transmitted through the monitoring shutter Sm and received thereby, is inputted to a control circuit C for controlling driving voltages to be applied to individual micro portions of the light shutter S.

Next, a composition of this control circuit C is explained with reference to FIG. 2.

As stated above, the PLZT being an electro-optical material which exhibits electro-optical effects can make a phase shift of a polarized component change responsive to a driving voltage applied thereto and, accordingly, an amount of a transmission light is made different.

Figure 4:
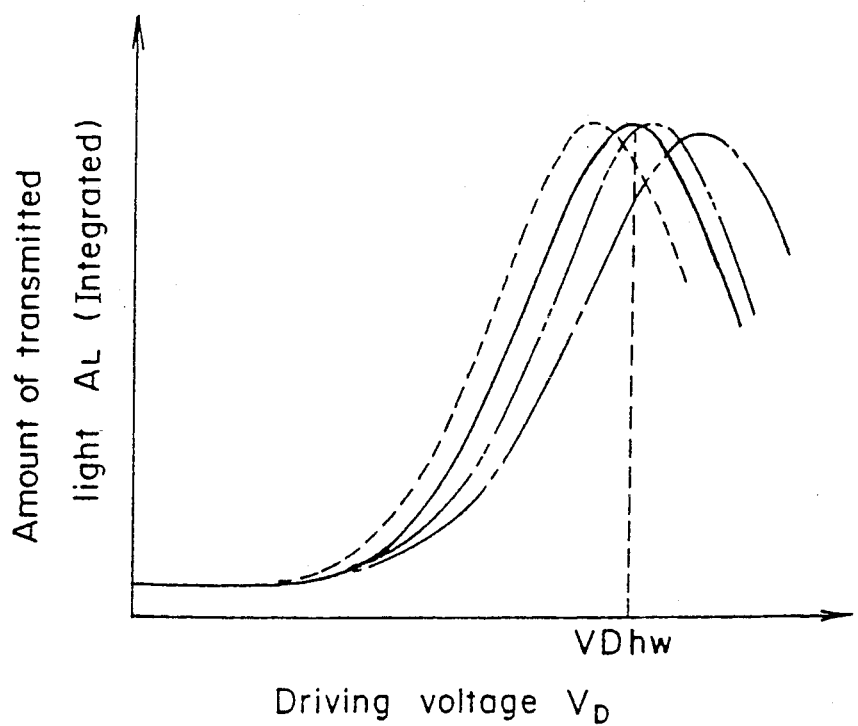
FIG. 4 is a graph showing a relation between a driving voltage $V_D$ and an amount of transmitted light $A_L$.
Figure 5:
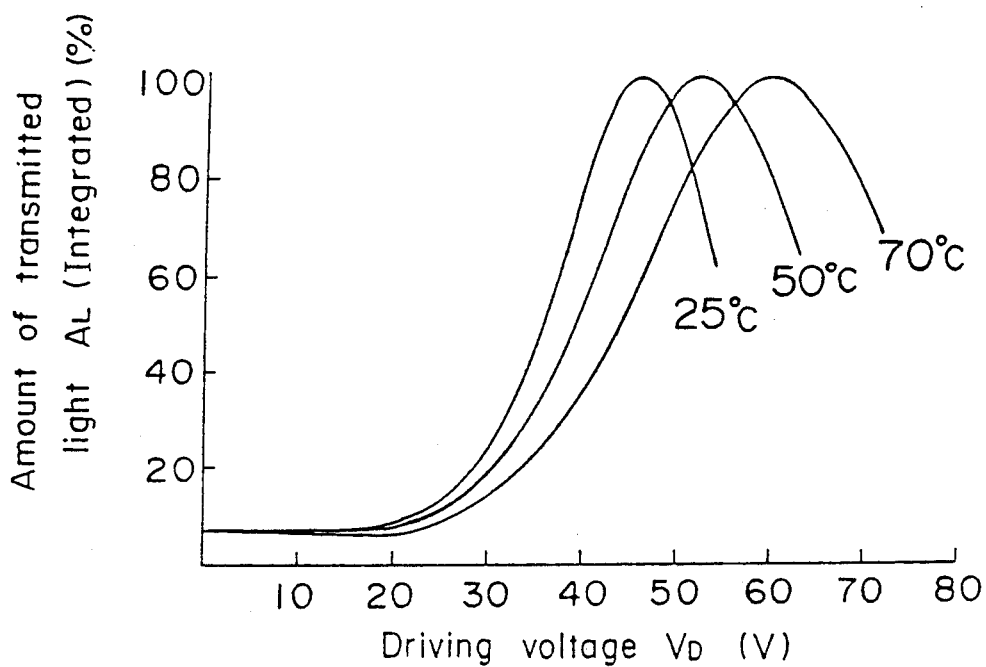
FIG. 5 is a graph showing the relation as shown in FIG. 4 obtained at different temperatures of the light shutter.
Figure 6:
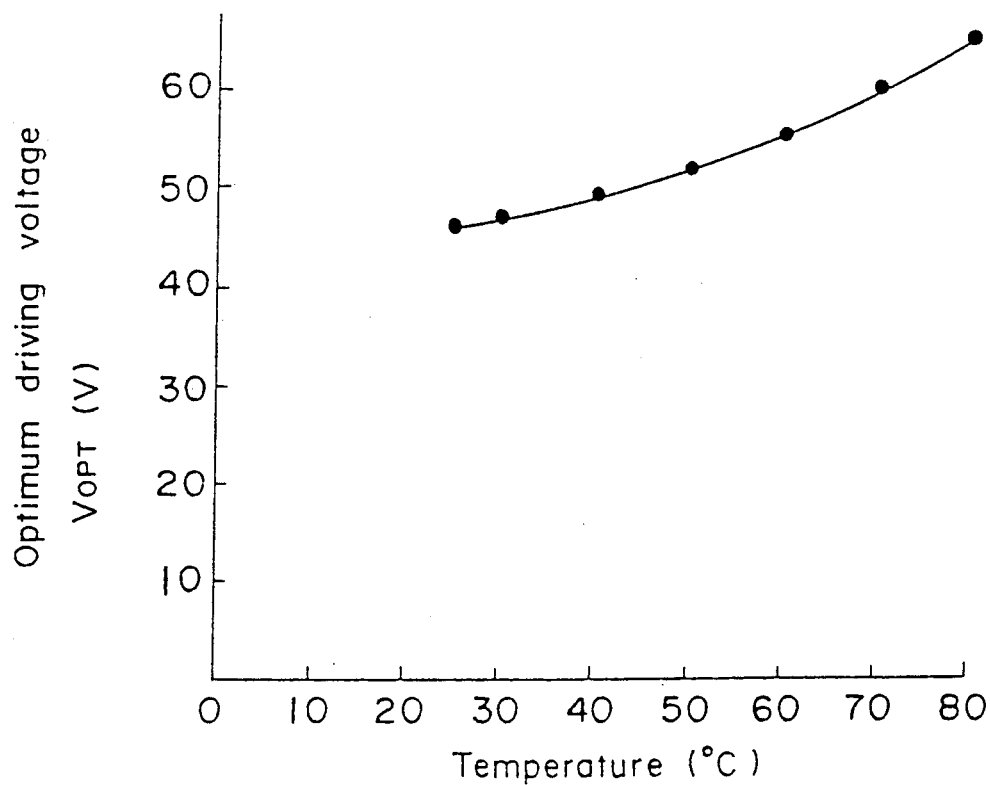
FIG. 6 is a graph showing a relation between temperature and an optimum driving voltage $V_{opt}$.

FIG. 4 shows a variation of an amount $A_L$ of a transmission light transmitting through a micro portion when a driving voltage $V_D$ applied thereto is varied while keeping an application time i.e. a pulse rate in pulse drive constant. $A_L$ becomes maximum at $V_{Dhw}$ which is called half wavelength voltage, as indicated by a solid line in FIG. 4. However, the relation between said $V_D$ and $A_L$ varies according to a temperature of the PLZT array, as shown in FIG. 5 and, accordingly, the most optimum driving voltage $V_{opt}$ ($=V_{Dhw}$) varies according to a temperature, as shown in FIG. 6.

Thus the optimum driving voltage $V_{opt}$ should be increased as the temperature rises. Further, optical fatigue due to internal polarization caused for a long time of use at each micro portion should be considered to maintain a constant record density to identical print information since it gives influence to $V_{opt}$. In general, $V_{opt}$ should be increased as the optical fatigue becomes large. However, it is to be noted that the optical fatigue is not uniform different frequencies. If the micro portion has been driven frequently, $V_{opt}(V_{Dhw})$ should be shifted toward higher voltage side by a large amount, as indicated by chain lines in FIG. 4, but $V_{opt}$ of the micro portion not having been driven so frequently should be shifted by a small amount, as indicated by double chain lines in FIG. 4.

Further, in a case that voltages for generating an electric field reversed from that generated by the driving voltage in each micro portion are applied to all PLZT elements during waiting time from discharge of a printed sheet to set of a blank print sheet in order to reduce the optical fatigue, and internal polarization of a reversed direction may be caused in a PLZT element having been driven scarcely and, accordingly, $V_{Dhw}$ shifts toward lower voltage side, as indicated by a dotted line in FIG. 4. Thus $V_{Dhw}$ becomes different depending on an individual history of drive.

In the preferred embodiment, two micro portions 9a and 9b of the monitoring shutter Sm may be driven under different conditions to obtain information regarding a variety of $V_{Dhw}$. For example, a driving voltage is always applied to one of them during printing operation and to the other no driving voltage, monitoring light shutter Sm wherein two micro portions are driven under conditions extremely different from each other may reflect a mean value of $V_{Dhw}$. More concretely, light having been transmitted through the PLZT elements 9a and 9b are received by a light receiving device 18 simultaneously and an output thereof is used to determine the driving voltage of the light shutter S.

Figure 7:
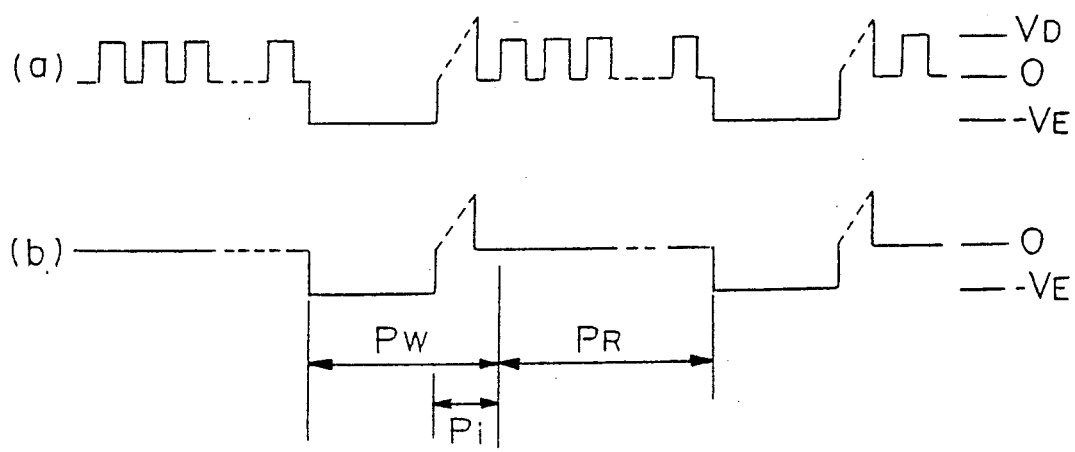
FIG. 7 is a time chart showing driving conditions for PLZT elements of the monitoring light shutter Sm.

FIG. 7 shows time charts for showing driving conditions of two micro portions 9a and 9b of the monitoring light shutter Sm.

Time chart A is for the micro portion which is always driven in print operation and time chart B is for the other micro portion which is not driven at all. As shown in FIG. 7, a negative voltage ($-V_e$) is applied to each micro portion during each waiting time $P_W$ to recover the optical fatigue thereof and a time interval Pi is provided at the end of the waiting time Pw for setting an optimum driving condition for the next print operation.

Figure 8:
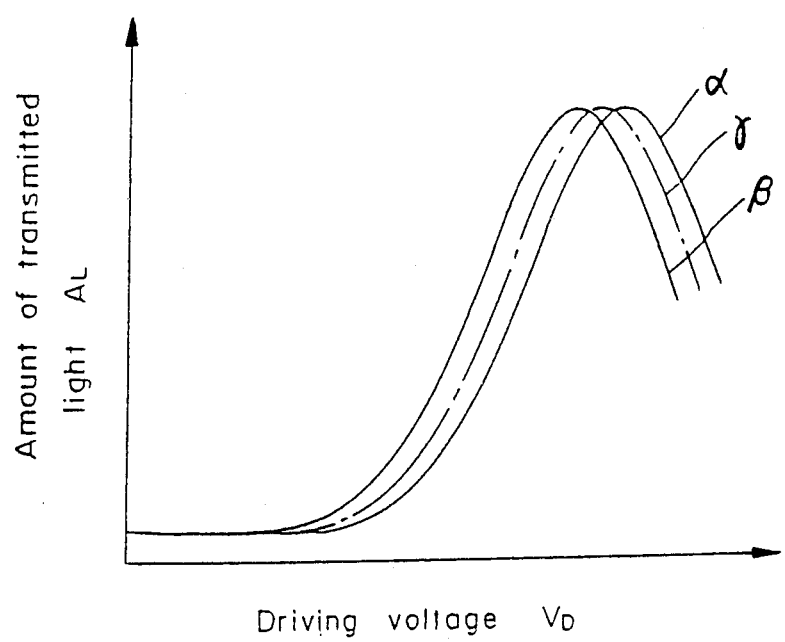
FIG. 8 is a graph showing variation of an amount of transmitted light according to individual driving conditions.

FIG. 8 shows a relationship of the amount $A_L$ of a light transmitted and the driving voltage $V_D$ wherein curve $\beta$ indicates data obtained from one of two micro portions to which a driving voltage is always applied and curve $\beta$ indicates data obtained from the other one which is not driven at all. Curve $\gamma$ indicates data actually obtained by the light receiving device 18. Since the curve $\gamma$ seems to reflect a mean value averaged over all micro portions of the light shutter S, the optimum driving condition is determined according to information obtained from the light receiving device 18. In otherwise, it is possible to use two light receiving devices respectively receiving the lights transmitting through two micro portions 9a and 9b and to average outputs from both light receiving devices 9a and 9b.

Figure 9:
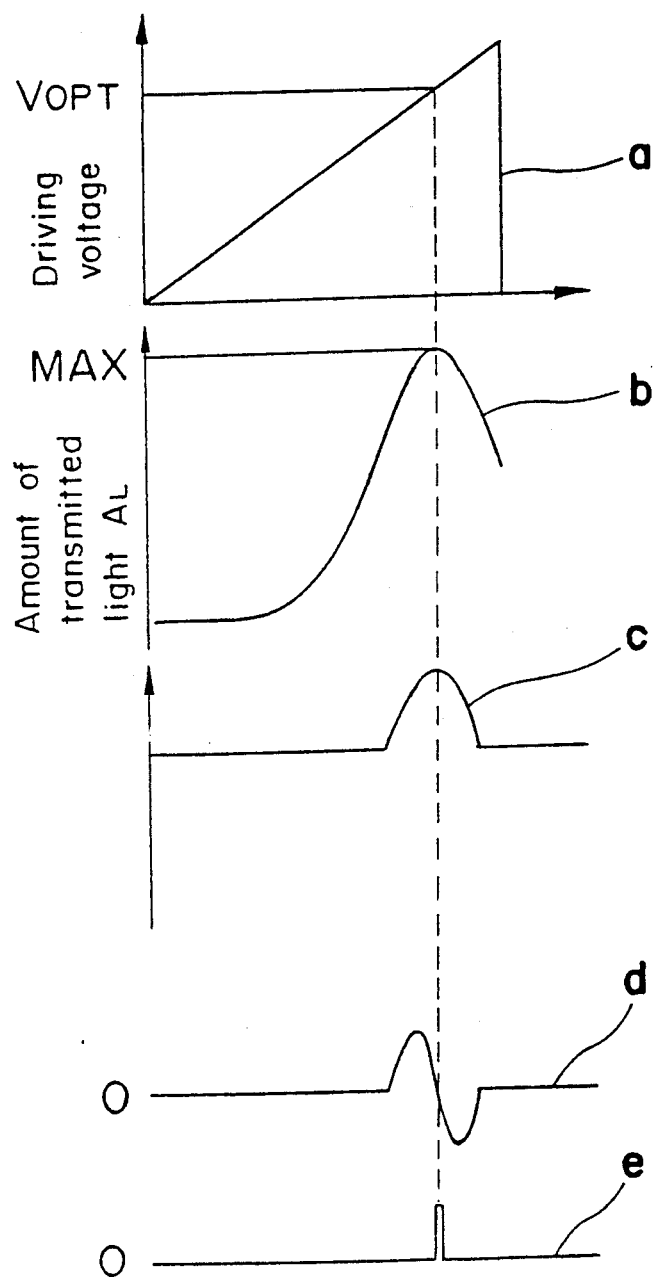
FIG. 9 is a time chart showing actions of the driving voltage control circuit.

Next, composition and actions of the control circuit C are explained with reference of FIG. 2 and FIG. 9.

As shown in FIG. 2, to the voltage generator 16 for applying a driving voltage to the driving pulse generating circuit 15, either of outputs from a voltage scanner 20 and a first sample hold amplifier 21 is inputted via a switch 19, selectively. The switch 19 is connected to the voltage scanner 20 during the time interval Pi for setting the optimum driving condition. In this time interval, the voltage scanner 20 varies linearly an output driving voltage $V_D$ from 0 V to a voltage exceeding the half wavelength voltage, and driving voltage $D_D$ varying linearly is applied as pulses generated by the driving pulse generating circuit 15 to each micro portion of the monitoring shutter Sm and, accordingly, the amount of the light transmitted through the monitoring shutter Sm varies.

A light current outputted from the light receiving device 18 is input to a light amount integrator 22 of the control circuit C and integrated therein. The light amount integrator 22 integrates the light current from the light receiving device 18 in synchronization with driving pulses applied to the micro portion of the monitoring light shutter Sm and the output therefrom increases as the driving voltage $V_D$ increases, as indicated by b in FIG. 9. It is to be noted that the curve b corresponds to the curve $\gamma$ in FIG. 8. The output of the light amount integrator 22 is shaped to a waveform as indicated by c in FIG. 9 by a slicer 23 and, then, input to a differentiator 24 and differentiated thereby, as indicated by d in FIG. 9. A sample hold circuit 25 connected to the output of the differentiator 24 outputs a sample hold pulse as indicated by e in FIG. 9 when an inflection point of the curve b, namely, a point at which $A_L$ regarding the monitoring shutter Sm becomes maximum is detected from the differential signal of the differentiator 24.

This sample hold pulse e is input to the first sample hold amplifier 22 and a second sample hold amplifier 26 to which the output of the light amount integrator 22 is input, respectively. The first sample hold amplifier 21 holds the output voltage from the voltage scanner 20 as the optimum driving voltage $V_{opt}$ at a timing of the sample hold pulse e and the second one 26 holds the output from the light amount integrator 22 as the maximum amount $A_{max}$ of the transmitted light at the same timing.

When setting operation for the optimum driving condition is completed, the switch 19 is switched to the first sample hold amplifier 21. Thus, in the next print operation, the optimum driving voltage $V_{opt}$ hold thereat is applied, via the pulse generator 15, to individual micro portions of the light shutter S by the voltage generator 16. On the other hand, the output voltage from the second sample hold amplifier 26 corresponding to $A_{max}$ is input to a comparatione amplifier 28 together with a reference voltage $V_{REF}$ from a reference voltage generator 27 for setting an optimum light amount. The output of the comparatione amplifier 28 is input to a light amount controller 29 and the same controls the light source 7 according thereto to maintain a constant exposure condition.

In the above preferred embodiment, a number of the micro portion of the monitoring light shutter Sm may be three or more and is not limited to two. Also, driving conditions for the micro portions of the monitoring light shutter Sm are not limited to those of the above preferred embodiment and are alterable suitable.

Various control methods are available for controlling the printing operation to eliminate irregularity of print according to monitoring information.

For instance, it is possible to varying the light amount of the light source 7 solely or together with the driving voltage $V_D$. Also, it is possible to vary a rate of application of pulses as the driving voltage $V_D$.

Further, it is possible to detect an intensity of transmitted light directly in stead of measuring an amount of transmitted light by integration thereof. In this case, monitoring information is obtained by combining the intensity detected with a predetermined pulse rate.

Further more, it is possible to provide a monitoring light shutter Sm separately from the light shutter S and to drive the same under conditions independent from those of actual printing drive. In this case, the optimum driving voltage can be obtained in a printing cycle.

SECOND PREFERRED EMBODIMENT

Figure 10:
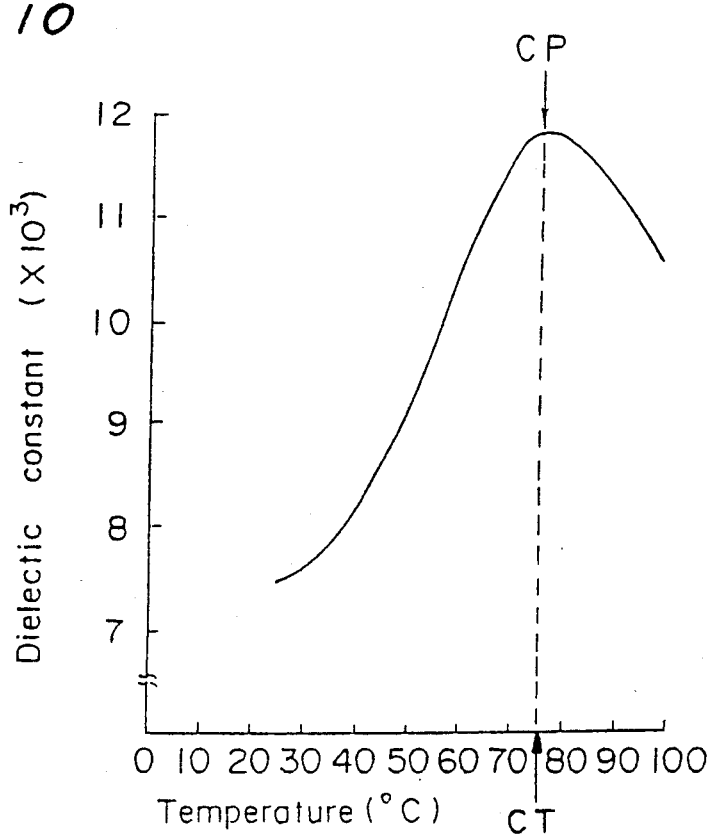
FIG. 10 is a graph showing a relation between a temperature and a dielectric constant of PLZT.

In the second preferred embodiment, there is detected in capacitance of a monitoring micro portion which is arranged at an end of a PLZT array forming a light shutter S. This is based on the fact that the relative dielectric constant of PLZT varies with a temperature having a peak at the Curie point CP thereof, as shown in FIG. 10. In other words, it is possible to detect the temperature of the PLZT array by detecting variation of the dielectric constant thereof which is detectable from variation of the capacitance thereof. In this embodiment, the construction of the light shutter of the present invention provides compactness and the high accuracy of temperature detecting, comaring with the conventional light shutter which has the temperature sensor thereon.

Figure 11:
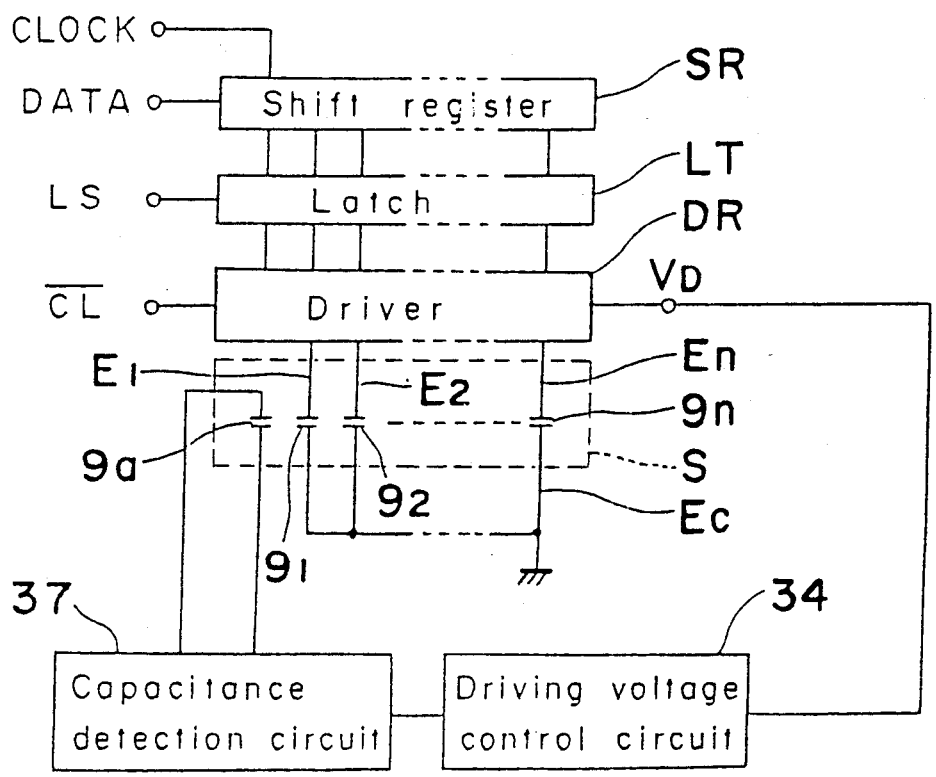
FIG. 11 is a block diagram showing a second preferred embodiment of the present invention.

FIG. 11 shows a schematic composition of a driving circuit for driving the light shutter S. The light shutter S has a monitoring micro portion 9a other than micro portion $9_1$ to $9_n$. The capacitance of the monitoring micro portion 9a is detected by a capacitance detection circuit 37.

A driving voltage control circuit 34 controls a driving voltage $V_D$ according to data outputted from the capacitance detection circuit 37 and a driver DR drives the light shutter S by applying the driving voltage to $V_D$ to individual electrodes $E_1$ to $E_n$ of the micro portions 9, to $9_n$ according to print data input to a shift register SR selectively. The print data input to the shift register SR are latched once by a latch circuit LT in response to a latch signal LS and latched data are outputted to the driver DR which selects micro portions to be driven according to the print data input.

Figure 12:
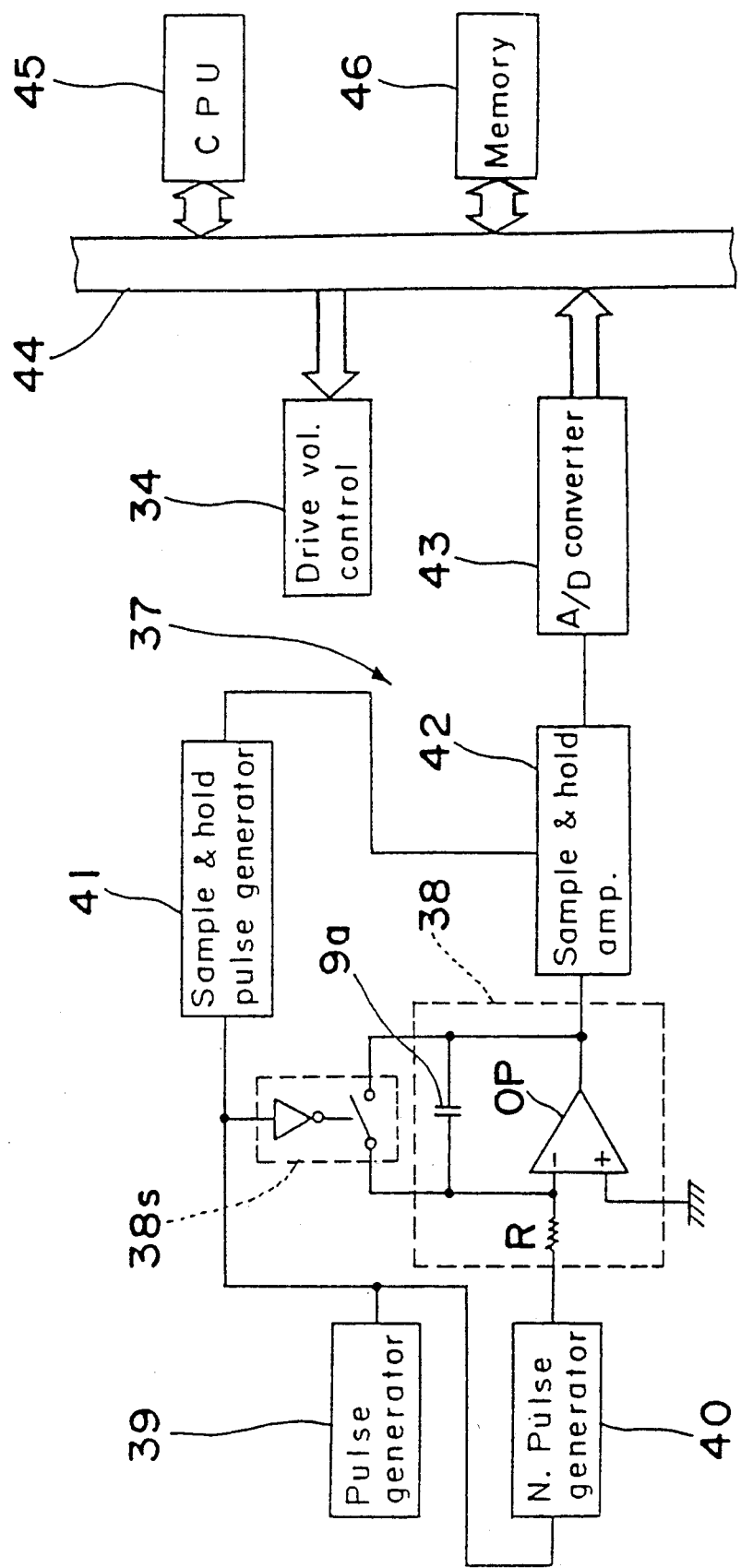
FIG. 12 is a block diagram of the capacitance detection circuit shown in FIG. 11.

FIG. 12 shows a composition of the capacitance detection circuit 37.

Figure 13:
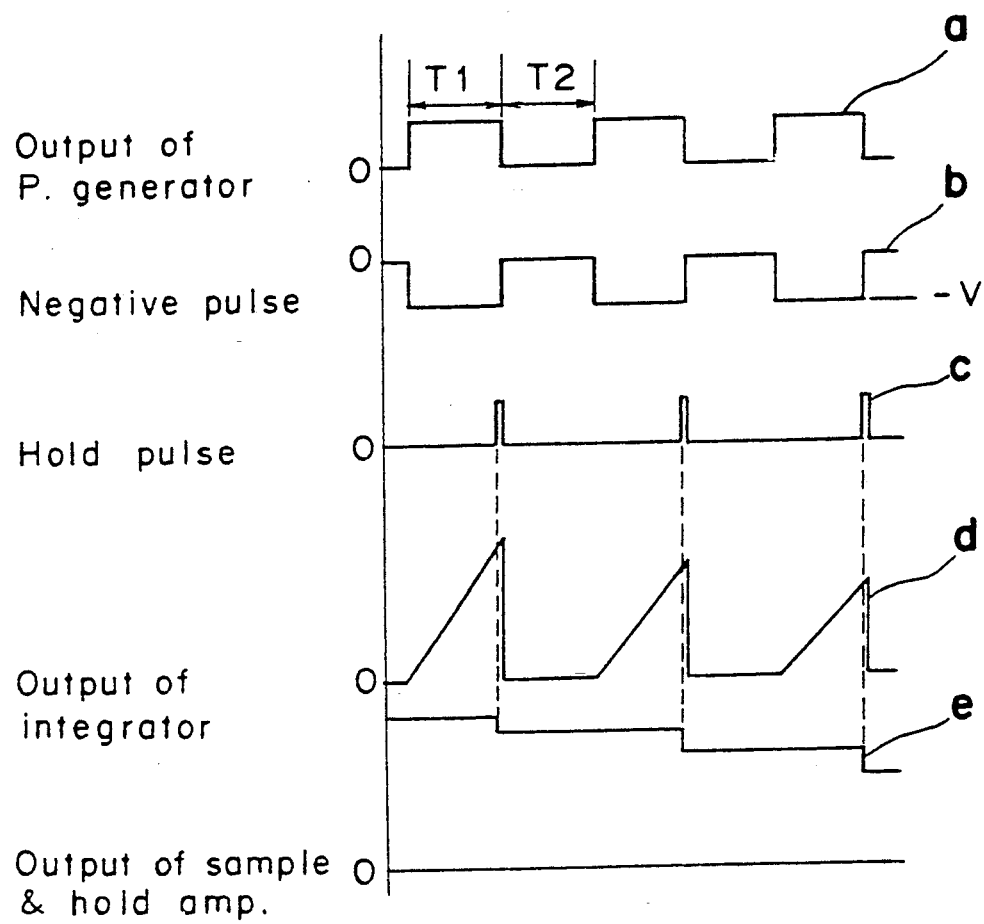
FIG. 13 is a time chart showing actions of the capacitance detection circuit shown in FIG. 12.

The capacitance detection circuit 37 includes an integrator 38 consisted an operational amplifier 38 to which the monitoring micro portion 9a as a capacitor and a resistance R are coupled. The capacitance of the monitoring micro portion 9a is detected as a time constant of the integrator 38. In order for that, a pulse generator 39 generates pulses as indicated by a in FIG. 13 to operate a switching circuit $38_S$ provided for the integrator 38 and a negative pulse generator 40 generates negative pulses of $(-V)$ as indicated by b in FIG. 13 in synchronization with pulses generated by the pulse generator 39. The negative pulses are input to the integrator 38. In a time period $T_1$ that the output signal of the pulse generator 39 is in High level, the switching circuit $38_S$ is opened. In this state, the monitoring micro portion 9a having a capacitance C is charged with a constant charging current $V/R$ to a voltage determined by $T_1 \cdot V/C \cdot R$. The output voltage from the integrator 38 as indicated by d in FIG. 13 is latched by a sample hold amplifier 42 at a timing when a sample hold pulse as indicated by C in FIG. 13 is input from a sample hold pulse generator 41 in synchronization with a drop of the output signal of the pulse generator 39 and the latched voltage is held till the next sample hold pulse is input. Since the capacitance C of the monitoring micro portion 9a increases as the dielectric constant increases by a rise of temperature, the voltage held by the sample hold amplifier 42 is reduced as the temperature increases, as indicated by e in FIG. 13.

The switching circuit 38S is closed during a time period $T_2$ when the output pulse signal of the pulse generator 39 is in Low level and, thereby, both ends of the monitoring micro portion 9a are short-circuited. Thus, the output of the integrator 38 becomes 0 V.

The output of the sample hold amplifier 42 is digitalized by an analog to digital converter 23 and input to a CPU 45 via a bus line 44. The CPU 45 accesses a memory 46 wherein a table representing a relation between the output voltage of the integrator 38 and the modulation optimum voltage $V_{opt}$ is stored and the modulation optimum voltage $V_{opt}$ corresponding to the output voltage held by the sample hold amplifier 42 is read out therefrom. The CPU 45 outputs $V_{opt}$ to the driving voltage control circuit 34 and the latter applies input $V_{opt}$ to the driver DR for the light shutter S.

THIRD PREFERRED EMBODIMENT

Figure 14:
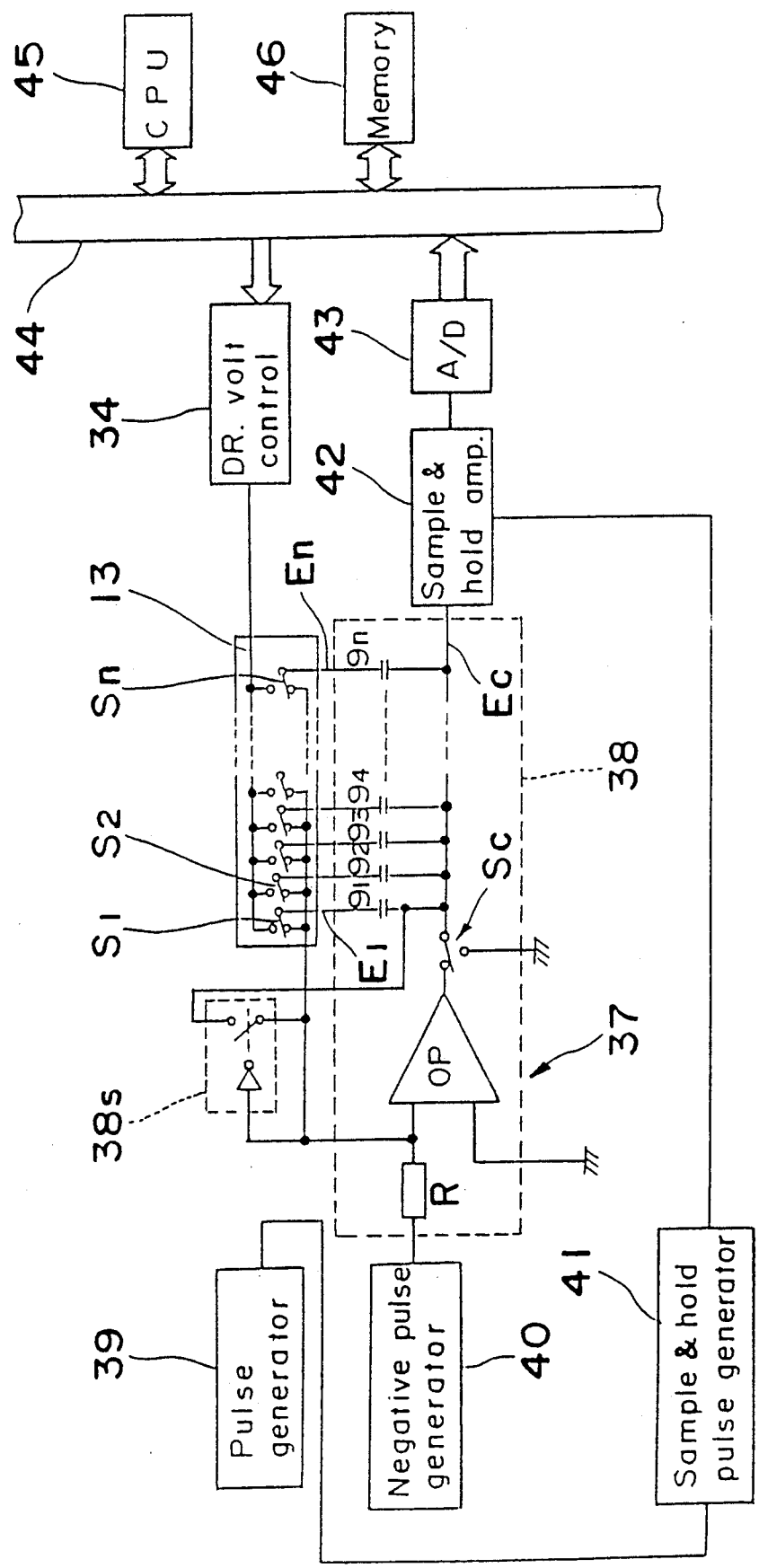
FIG. 14 is a block diagram showing a third preferred embodiment of the present invention.

FIG. 14 shows a third preferred embodiment wherein dielectric constants of all micro portions $9_1$ to $9_n$ of a light shutter S are measured and averaged to detect a mean temperature thereof.

Individual electrodes $E_1$ to $E_n$ of micro portions $9_1$ to $9_n$ are switched by switches $S_1$ to $S_n$ of a driver DR between a state connected to a driving voltage control circuit 34 and a state connected to the ground, respectively. A switch $S_c$ is provided for switching a common electrode $E_c$ of the light shutter S between a state connected to the ground and a state connected to an output of an operational amplifier OP forming an integrator 38. All other circuits are same as those indicated by same reference numerals in FIG. 12.

In a printing operation individual electrodes $E_1$ to $E_n$ of the light shutter S are connected to the driving voltage control circuit 34 and the common electrode $E_c$ is connected to the ground.

On the other hand, in a waiting mode, individual electrodes $E_1$ to $E_n$ are connected to the ground and the common electrode $E_c$ is connected to the output of the operational amplifier OP. Accordingly, all micro portions $9_1$ to $9_n$ are charged and the sample and hold amplifier 42 monitors a voltage of the common electrode $E_c$ and the voltage held thereby is fed back to the driving voltage control circuit 34.

The voltage $V_c$ of the common electrode $E_c$, when charged by a charging current I for a predetermined time period T, is represented by the following equation assuming capacitances $C_1$ to $C_n$ of the micro portions $9_1$ to $9_n$.

$$V_c = I \cdot T / (C_1 + C_2 + \ldots + C_n)$$

Thus, the voltage $V_c$ detected reflects a mean value averaged over all capacitances of the micro portions $9_1$ to $9_n$.

Control of the driving voltage is done using the voltage $V_c$ detected in a manner similar to that of the second preferred embodiment.

Since the voltage $V_c$ obtained in the present embodiment is a real mean value averaged over all micro portions $9_1$ to $9_n$ of the light shutter S, the accuracy of control is highly enhanced and the control can be made without providing any extra monitoring micro portions.

FOURTH PREFERRED EMBODIMENT

Figure 15:
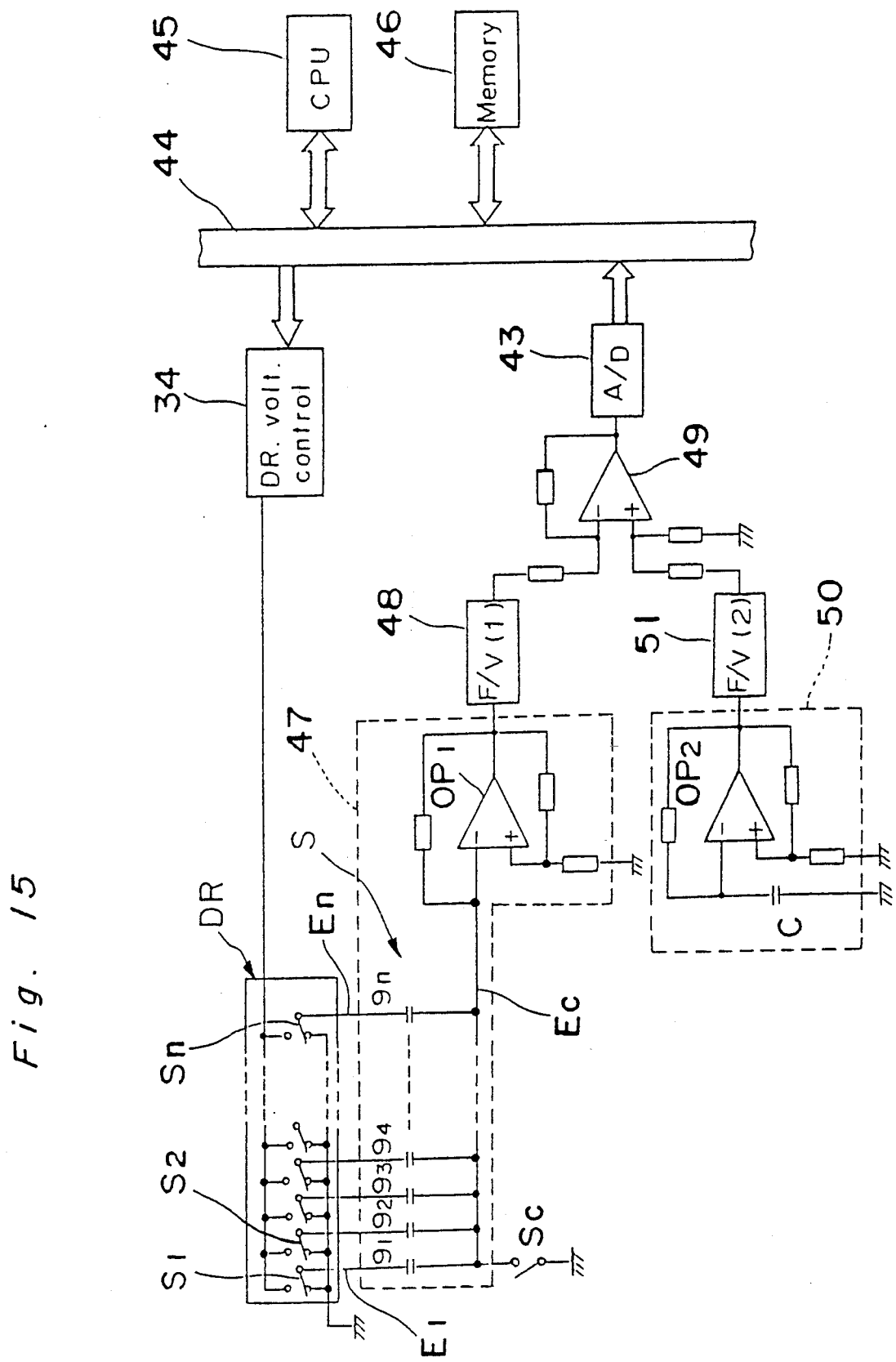
FIG. 15 is a block diagram showing a fourth preferred embodiment of the present invention.

FIG. 15 shows a fourth preferred embodiment wherein an oscillation circuit 47 is provided by combining an operational amplifier OP 1 with a light shutter S comprised of micro portions $9_1$ to $9_n$. In this embodiment, an averaged dielectric constant is detected utilizing the fact that an oscillation frequency of the oscillation circuit 47 varies according to a composited value with respect to all capacitances $C_1$ to $C_n$ of the micro portions $9_1$ to $9_n$.

In a printing operation, individual electrodes $E_1$ to $E_n$ are connected to a driving voltage control 34 and a common electrode $E_c$ is connected to the ground to operate the light shutter S. On the other hand, in a waiting mode, individual electrodes $E_1$ to $E_n$ are connected to the ground and the common electrode $E_c$ is connected to the output of the operational amplifier OP 1 to operate the oscillation circuit 47.

The output of the oscillation circuit 47 is input to one of input terminals of a comparator 49 after converted by a frequency to voltage converter 51. A reference voltage signal obtained by converting a reference oscillation signal from a reference oscillation circuit 50 by a frequency to voltage converter 51 is input to another input of the comparator 49 and a result of comparison is outputted as a voltage signal from the comparator 49. Thereafter, the output thereof is input to a CPU 45 via a bus line 44 after converted by a analog to digital converter 43.

Control of the driving voltage is done in a manner similar to that of the second preferred embodiment.

Instead of inputting the reference voltage signal obtained by converting an output from the reference oscillation circuit 50, a reference voltage signal can be input to the comparator 49 directly.

Further, it is possible to detect variation of a composite capacitance of all micro portions $9_1$ to $9_n$ by detecting variation of a resonance oscillation frequency accompanied thereby.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A light printer for writing information on a photoconductor by light comprising:
   a light source,
   a light shutter arranged between said light source and said photoconductor and having a plurality of electro-optical elements aligned in a row, at least two of said plurality of electro-optical elements being designed as monitoring elements,
   record control means for applying driving voltages to respective electro-optical elements according to recording data,
   monitoring drive means for applying driving voltages of different values, from each other, to respective monitoring elements,
   at least one photosensor for detecting quantities of light transmitting through said respective monitoring elements, and
   light quantity control means for controlling quantities of light transmitting through said respective electro-optical elements of said light shutter by controlling said record control means according to the quantities of light detected by said photosensor.

2. A light printer as claimed in claim 1 wherein said light quantity control means is comprised of means for varying said driving voltages to be applied to said electro-optical elements by said record control means.

3. A light printer as claimed in claim 1 wherein said light quantity control means is comprised of means for controlling the quantity of light of said light source.

4. A light printer as claimed in claim 1 wherein said light quantity control means is comprised of means for varying said driving voltages to be applied to said electro-optical elements by said record control means and simultaneously controlling the quantity of light of said light source.

5. A light printer as claimed in claim 1 wherein said monitoring drive means drives said at least two monitoring elements so as to one of them light transmitting and the other light blocking.

6. A light printer as claimed in claim 1 wherein each of said electro-optical elements is comprised of a PLZT device.

7. A light printer as claimed in claim 5 wherein said at least one photosensor detects quantities of light having been transmitted through said at least two monitoring elements and outputs a quantity of light averaged over said quantities of transmitted lights.

8. A light printer as claimed in claim 5 wherein quantities of light having been transmitted through said at least two monitoring elements are separately detected by at least two photosensors.

9. A light printer as claimed in claim 8 wherein said light quantity control means controls said record control means based on a quantity of light averaged over quantities of light separately detected by said at least two photosensors.

10. A light printer comprising:

a light shutter arranged between a light source and a photoconductor which has a plurality of electro-optical elements aligned in a row, record control means for applying driving voltages to respective electro-optical elements according to recording data;

a monitoring light shutter being comprised of at least two of said electro-optical elements, means for applying driving voltages of different values to said at least two electro-optical elements from each other, respectively;

a monitoring illumination means for illuminating said at least two electro-optical elements, monitoring photosensor means for detecting quantities of light having been transmitted through said at least two electro-optical elements; and a light quantity control means for controlling quantities of light transmitting through said respective electro-optical elements of said light shutter by controlling said record control means according to quantities of light detected by said monitoring photosensor means.

11. A light printer as claimed in claim 10 wherein said light quantity control means is comprised of means which varies said driving voltages to be applied to respective electro-optical elements by said record control means.

12. .. light printer as claimed in claim 10 wherein said light quantity control means is comprised of means which controls the quantity of light of said light source.

13. A light printer as claimed in claim 10 wherein said light quantity control means varys driving voltages to be applied to respective electro-optical elements by said record control means and simultaneously controls the quantity of light of said light source.

14. A light printer as claimed in claim 10 wherein said monitoring light shutter is comprised of two light shutter elements either one of which is opened fully while the other one is closed during recording images.

15. A light printer as claimed in claim 10 wherein each of said light shutter elements of said light shutter and said monitoring light shutter is a PLZT device.

16. A light printer as claimed in claim 14 wherein said monitoring photosensor means having one photosensor detects quantities of light having transmitted through said at least two electro-optical elements of said monitoring light shutter and outputs a mean value averaged over said quantities of lights detected.

17. A light printer as claimed in claim 14 wherein said monitoring photosensor means is comprised of two independent photosensors for detecting quantities of light having transmitted through said light shutter elements.

18. A light printer as claimed in claim 17 wherein said light quantity control means controls said record control means based on a quantity of light averaged over quantities of light detected by said monitoring photosensor means.

19. A light printer for writing information on a photoconductor with light comprising:

a light source, a light shutter arranged between said light source and photoconductor which has a plurality of electro-optical elements aligned in a row, record control means for applying driving voltages to said light shutter, measurement means for measuring dielectric constants of at least one shutter element of said light shutter means; and light quantity control means for controlling to adjust quantities of light transmitting through said respective electro-optical element according to said dielectric constants measured by said measurement means.

20. A light printer as claimed in claim 19 wherein said light quantity control means is comprised of means for varying said driving voltages to be applied to respective electro-optical elements by said record control means.

21. A light printer as claimed in claim 19 wherein said light quantity control means is comprised of means for controlling the quantity of light of said light source.

22. A light printer as claimed in claim 19 wherein said light quantity control means is comprised of means for varying driving voltages to be applied to respective electro-optical elements by said record control means and simultaneously controlling the quantity of light of said light source.

23. A light printer as claimed in claim 19 wherein said light shutter is comprised of PLZT devices.

24. A light printer as claimed in claim 19 wherein said measurement means is means for detecting capacitances of at least one shutter element of said light shutter means.

* * * * *